United States Patent [19]

Chang et al.

[11] Patent Number: 5,017,679

[45] Date of Patent: May 21, 1991

[54] POLYESTERS TERMINATED WITH CARBOXYCYCLOHEXANECARBOXYLATE GROUPS

[75] Inventors: Yeong-Ho Chang; Glenn C. Jones, both of Kingsport, Tenn.

[73] Assignee: Eastman Kodak Company, Rochester, N.Y.

[21] Appl. No.: 400,429

[22] Filed: Aug. 30, 1989

[51] Int. Cl.$^5$ ............................................. C08G 63/02
[52] U.S. Cl. .................................... 528/272; 528/296; 528/301; 528/304; 528/308; 528/308.6; 525/437; 525/444
[58] Field of Search ............... 528/272, 296, 301, 304, 528/308, 308.6; 525/437, 444

[56] References Cited

U.S. PATENT DOCUMENTS

| | | | |
|---|---|---|---|
| 4,499,239 | 2/1985 | Murakami et al. | 525/111 |
| 4,740,580 | 4/1988 | Merck et al. | 528/272 |
| 4,818,791 | 4/1989 | Murakami et al. | 525/124 |

*Primary Examiner*—John Kight, III
*Assistant Examiner*—Sam A. Acquah
*Attorney, Agent, or Firm*—J. Frederick Thomsen; William P. Heath, Jr.; Bernard J. Graves, Jr.

[57] ABSTRACT

Disclosed are carboxyl polyesters which are useful in the formulation of powder coating compositions. The polyesters are characterized by the presence of terminal carboxycyclohexanecarboxylate groups. Also disclosed is a process for the preparation of the carboxyl polyesters from similar hydroxy polyesters.

7 Claims, No Drawings

POLYESTERS TERMINATED WITH CARBOXYCYCLOHEXANECARBOXYLATE GROUPS

This invention pertains to certain polyesters composed of polymer chains which are terminated with carboxycyclohexanecarboxylate groups. More particularly, this invention pertains to carboxyl polyesters which are especially useful in powder coating compositions due to their glass transition temperature which are sufficiently high to avoid or minimize the problem of caking or sintering upon storage.

Carboxyl polyesters having acid numbers in the range of 25 to 45 are employed in combination with epoxy cross-linking agents such as triglycidylisocyanurate and with epoxy-containing polymers such as polymers derived from glycidyl acrylate and methacrylate in thermosetting powder coating compositions. These polyesters typically are prepared by first esterifying or transesterifying isophthalic and/or terephthalic acids or dialkyl esters thereof with 2,2-dimethyl-1,3-propanediol, with or without one or more additional diols, and then reacting the resulting diester with isophthalic and/or terephthalic acid until a polyester having the desired molecular weight, acid number and hydroxyl number is obtained.

Another procedure involves end-capping a hydroxyl polyester, e.g., a polyester having a hydroxyl number of 20 to 50 and an acid number of less than 10, by reacting it with terephthalic or isophthalic acid to raise the acid number of the polyester to 25 or greater. These procedures require prolonged reaction times due to the reactivity/solubility of the isophthalic and terephthalic acids in the diester precursor and the hydroxyl polyester. Modifying a hydroxyl polyester, e.g., a hydroxyl polyester derived from terephthalic acid and 2,2-dimethyl-1,3-propanediol, with aliphatic diacids generally results in a polyester having a glass transition temperature lower than that of the hydroxyl polyester. As the Tg of the polyester drops below 55° C., powder coating compositions containing the polyester tend to cake or sinter upon storage, rendering the composition less useful.

We have discovered that hydroxyl polyesters can be end-capped with 1,3- and/or 1,4-cyclohexanedicarboxylic acid and/or anhydrides thereof to obtain a carboxyl polyester having a Tg sufficiently high to render the polyester suitable for use in powder coating compositions. The novel carboxyl polyester provided by this invention has (i) an inherent viscosity of about 0.1 to 0.4, (ii) a glass transition temperature of about 55 to 70° C., (iii) an acid number of about 20 to 50, and (iv) a number average molecular weight of about 1500 to 5000 and is comprised of:

A. diacid residues comprising at least about 95 mole percent aromatic dicarboxylic acid residues;
B. diol residues comprising at least about 95 mole percent of (i) 2,2-dimethyl-1,3-propanediol residues or (ii) a mixture of at least 40 mole percent 2,2-dimethyl-1,3-propanediol and up to 60 mole percent 1,4-cyclohexanedimethanol and/or 2,2,4,4-tetramethyl-1,3-cyclobutanediol;
C. up to about 5 mole percent of triol residues; and
D. terminal 3- and/or 4-carboxycyclohexanecarboxylate groups;
provided that at least about 95 percent of the moles of diacid, diol and triol residues, i.e., exclusive of the terminal residues D, are aromatic dicarboxylic acid, 2,2-dimethyl-1,3-propanediol, 1,4-cyclohexanedimethanol, 2,2,4,4-tetramethyl-1,3-cyclobutanediol and triol residues. The above definitions of components A and B are based on the total diacid residues being equal to 100 mole percent and the total diol residues being equal to 100 mole percent.

We have found that the above-described carboxyl polyesters having a desirable Tg may be obtained by reacting a hydroxyl polyester consisting of components A, B, and C and having an acid number of about 0 to 15, a hydroxyl number of about 20 to 50 and a Tg of about 60 to 70° C. with 1,3- and/or 1,4-cyclohexanedicarboxylic acid and/or the anhydrides thereof. The incorporation of the 3- and/or 4-carboxycyclohexanecarboxylate end groups, i.e., chain-terminating groups, into the polyester does not cause a severe depression of the Tg. Another advantageous feature of our invention is the relatively rapid rate at which the hydroxyl polyesters may be converted to carboxyl polyesters by the reaction of the former with 1,3- and/or 1,4-cyclohexanedicarboxylic acid or, especially, the anhydrides thereof.

Diacid residues A are derived primarily from carbocyclic, aromatic dicarboxylic acids or esters thereof such as isophthalic acid, terephthalic acid, 2,6-naphthalenedicarboxylic acid, 2,7-naphthalenedicarboxylic acid and the alkyl and dialkyl, e.g. methyl and ethyl, esters thereof. Diacid residues A may comprise a minor amount, e.g. up to 5 mole percent, of one or more other diacid residues derived from aliphatic or alicyclic acids such as succinic, glutaric, adipic, azelaic, sebacic, fumaric, maleic, itaconic, 1,3- and 1,4-cyclohexanedicarboxylic acids and the like. Diacid residues A preferably consist essentially of isophthalic and/or terephthalic acid residues.

In addition to 2,2-dimethyl-1,3-propanediol, 1,4-cyclohexanedimethanol and 2,2,4,4-tetramethyl-1,3-butanediol residues, diol component B may include up to 5 mole percent of residues derived from one or more other diols such as, for example, ethylene glycol, propylene glycol, 1,3-propanediol, 2,4-dimethyl-2-ethylhexane-1,3-diol, 2-ethyl-2-butyl-1,3-propanediol, 2-ethyl-2-isobutyl-1,3-propanediol, 1,3-butanediol, 1,4-butanediol, 1,5-pentanediol, 1,6-hexanediol, thiodiethanol, 1,4-xylylenediol and the like. It is preferred that component B consists essentially of 2,2-dimethyl-1,3-propanediol, 1,4-cyclohexanedimethanol and/or 2,2,4,4-tetramethyl-1,3-butanediol residues in the amounts specified hereinabove. In the most preferred polyester, component B consists essentially of 2,2-dimethyl-1,3-propanediol residues.

The carboxyl polyester of our invention may contain up to about 5 mole percent of triol branching residues (component C) such as residues derived from trimethylolpropane, trimethylolethane, glycerin and similar trihydroxy compounds. As is specified above, the portion of our novel polyesters which are composed of residues A, B and C consist of at least 95 mole percent (1) diacid residues derived from one or more aromatic dicarboxylic acids or an ester-forming derivative thereof and (2) diol residues derived from 2,2-dimethyl-1,3-propanediol, 1,4-cyclohexanedimethanol and/or 2,2,4,4-tetramethyl-1,3-butanediol.

Component D consists of terminal, i.e., polyester chain ending or terminating, 3- and/or 4-carboxycyclohexanecarboxylate groups which are the reaction product of 1,3- and/or 1,4-cyclohexanedicarboxylic acid and/or the anhydrides thereof and a polyester terminal hydroxyl, e.g.

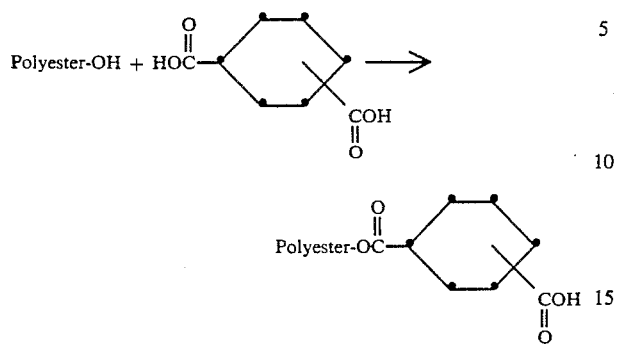

The amount of carboxycyclohexanecarboxylate groups present in or on the carboxyl polyester can vary significantly depending on factors such as the acid number of the polyester desired, the acid number of the hydroxy polyester from which the carboxyl polyester is derived, etc. Typically, the moles of carboxycyclohexanecarboxylate groups present will be in the range of about 1 to 10 mole percent, based on the total moles of components A, B, C and D.

The carboxyl polyester of the present invention preferably has (i) an inherent viscosity of about 0.15 to 0.3, (ii) a glass transition temperature of about 60° to 65° C., (iii) an acid number of about 25 to 40, and (iv) a number average molecular weight of about 2000 to 3500. Inherent viscosity (I.V., dl/g) is determined at 25° C. using 0.5 g of polyester per 100 mL of a solvent consisting of 60 parts by weight phenol and 40 parts by weight tetrachloroethane. Acid number and hydroxyl number are determined by titration and reported as mg of potassium hydroxide consumed per g of polyester. Glass transition temperatures (Tg, °C.) are determined by differential scanning calorimetry (DSC) on the second heating cycle at a scanning rate of 20° C. per minute after the sample has been heated to melt and quenched to below the Tg of the polyester. The weight average molecular weight (Mw) and number average molecular weight (Mn) are determined by gel permeation chromatography in tetrahydrofuran using a polystyrene standard and an ultraviolet detector.

The carboxyl polyesters of our invention which are particularly preferred have (i) an inherent viscosity of about 0.15 to 0.3, (ii) a glass transition temperature of about 60° to 65° C., (iii) an acid number of about 25 to 40, and (iv) a number average molecular weight of about 2000 to 3500 and are comprised of:

A. diacid residues consisting essentially of isophthalic and/or terephthalic acid residues;
B. diol residues consisting essentially of 2,2-dimethyl-1,3-propanediol residues; and
C. up to about 5 mole percent of triol residues; and
D. about 2 to 10 mole percent, based on the total moles of components A and B, of terminal 3- and/or 4-carboxycyclohexanecarboxylate groups.

The carboxyl polyesters described hereinabove can be prepared according to the process provided by this invention which comprises reacting a hydroxyl polyester having (i) an inherent viscosity of about 0.1 to 0.4, (ii) a glass transition temperature of about 60° to 70° C., (iii) a hydroxyl number of about 20 to 50, and (iv) a number average molecular weight of about 1500 to 5000 comprised of:

A. diacid residues comprising at least about 95 mole percent aromatic dicarboxylic acid residues;
B. diol residues comprising at least about 95 mole percent of (i) 2,2-dimethyl-1,3-propanediol residues or (ii) a mixture of at least 40 mole percent 2,2-dimethyl-1,3-propanediol and up to 60 mole percent 1,4-cyclohexanedimethanol and/or 2,2,4,4-tetramethyl-1,3-cyclobutanediol; and
C. up to about 5 mole percent of triol residues; with 1,3-cyclohexanedicarboxylic acid, 1,4-cyclohexanedicarboxylic acid, 1,3-cyclohexanedicarboxylic anhydride, 1,4-cyclohexanedicarboxylic anhydride or any combination thereof, to obtain a carboxyl polyester having an acid number of about 20 to 50. The process affords an efficient technique for converting hydroxyl polyesters to carboxyl polyesters at a relatively good rate without depressing substantially the Tg of the polyester.

The hydroxyl polyesters may be prepared according to conventional polycondensation procedures heating, e.g., at a temperature in the range of about 170° to 250° C., one or more dicarboxylic acids or their ester-forming equivalents with one or more diols using excess diol to obtain a polyester having a hydroxyl number of about 20 to 50, preferably about 25 to 40. The polyesters consist of repeating, alternating residues of dicarboxylic acids, diols and, optionally, triol branching agents. The polycondensation reaction is continued until a hydroxy polyester having an acid number of less than about 10 is obtained. Normally, the synthesis of the hydroxyl polyester is performed in the presence of a polycondensation catalyst such as organotin compounds, e.g., alkylstannoic acids, dialkyltin oxides, dialkyltin dicarboxylates, and organo-titanium compounds, e.g., titanium tetraalkoxides and acyl titanium trialkoxides. The hydroxyl polyester may be isolated or it may be used directly in the preparation of the carboxyl polyesters. Commercially available hydroxyl polyesters such as RUCOTE 107, CARGILL 3000 and 3016 and ARAKOTE 3109 may be used as the hydroxyl polyester reactant.

The reaction of the hydroxyl polyester with 1,3-cyclohexanedicarboxylic acid, 1,4-cyclohexanedicarboxylic acid, 1,3-cyclohexanedicarboxylic anhydride, 1,4-cyclohexanedicarboxylic anhydride or any combination thereof is carried out in a melt of the hydroxyl polyester, normally in the absence of solvent, at a temperature in the range of about 200° to 250° C. An excess, e.g. up to an excess of about 10 mole percent, of 1,3- or 1,4-cyclohexanedicarboxylic acid may be used and the esterification reaction is carried out until a carboxyl polyester having a predetermined acid number is obtained. While essentially all of the cyclohexanedicarboxylic acid is believed to react with terminal hydroxyl groups to form terminal carboxycyclohexanecarboxylate monoester groups, a minor amount possibly may be incorporated into the polymer chain. It will be understood that the carboxyl polyesters of this invention contain polyester chains terminated with hydroxyl and 4-carboxy groups derived from diacids A as well as carboxycyclohexanecarboxylate monoester groups. The 1,3- and 1,4-cyclohexanedicarboxylic acids may be the trans isomer, the cis isomer or a mixture thereof. Preferably, the cis:trans ratio is in the range of about 30:70 to 70:30. The cyclohexanedicarboxylic anhydrides and their reaction residues consist entirely of the cis isomer.

Our novel carboxyl polyesters and their preparation according to the process provided by our invention are further illustrated by the following examples. The melt viscosities reported were determined using an ICI melt viscometer at 200° C.

EXAMPLE 1

Terephthalic acid (365.64 g, 2.201 mol) and butanestannoic acid (FASCAT 4100, 0.6 g) were added to a melt of 2,2-dimethyl-1,3-propanediol (263.60 g, 2.531 mol) in a 1 L, 3-necked, round-bottom flask. The contents of the flask were swept with 1.0 standard cubic feet per hour (scfh) nitrogen and heated to 200° C. over a period of about 30 minutes. The reaction mixture was heated at 200° C. for 3 hours, at 210° C. for 2 hours and at 220° C. for 1 hour while distilling off the water of reaction. The temperature then was raised to and maintained at 230° C. until (about 6 hours) the acid number of the polyester was less than 10.

To the 230° C. melt of the hydroxyl polyester was added 1,3-cyclohexanedicarboxylic acid (cis:trans=about 30:70) (66.87 g, 0.388 mol) and the temperature was maintained at 230° C. for about 2 hours to obtain a carboxyl polyester having an acid number between 30 and 35. The molten polymer was poured into a syrup can where it was allowed to cool to a white solid. The polyester thus obtained had an I.V. of 0.185, an ICI melt viscosity at 200° C. of 30 poise, an acid number of 29.3, a hydroxyl number of 22.1 and a glass transition temperature of 65° C. The polyester had a weight average molecular weight of 9683 and a number average molecular weight of 3201 (Mw/Mn=3.0).

EXAMPLE 2

The procedure of Example 1 was repeated except that 1,4-cyclohexanedicarboxylic acid (66.87 g, 0.388 mol) was heated with the hydroxyl polyester at 230° C. for 2 hours to obtain a carboxyl polyester having an inherent viscosity of 0.184, a hydroxyl number of 23.8, an acid number of 29.0 and a glass transition temperature of 62° C. The polyester had a weight average molecular weight of 8705 and a number average molecular weight of 2990 (Mw/Mn=2.9).

EXAMPLE 3

Terephthalic acid (182.84 g, 1.101 mol) and butanestannoic acid (FASCAT 4100, 0.3 g) were added to a melt of 2,2-dimethyl-1,3-propanediol (135.70 g, 1.303 mol) in a 1 L, 3-necked, round-bottom flask. The contents of the flask were swept with 1.0 standard cubic feet per hour (scfh) nitrogen and heated to 200° C. over a period of about 30 minutes. The reaction mixture was heated at 200° C. for 3 hours, at 210° C. for 2 hours and at 220° C. for 1 hour while distilling off the water of reaction. The temperature then was raised to and maintained at 230° C. until (about 6 hours) the acid number of the polyester was less than 10.

To the 230° C. melt of the hydroxyl polyester was added 1,3-cyclohexanedicarboxylic anhydride (29.92 g, 0.196 mol) and the temperature was maintained at 230° C. for one hour. The molten polymer was poured into a syrup can where it was allowed to cool to a solid. The polyester thus obtained had an I.V. of 0.184, an ICI melt viscosity at 200° C. of 30 poise, an acid number of 35.1, a hydroxyl number of 23.4 and a glass transition temperature of 61° C. The polyester had a weight average molecular weight of 10,234 and a number average molecular weight of 3104 (Mw/Mn=3.3).

Comparative Examples 1 and 2 establish that the preparation of a carboxyl polyester by the copolymerization of cyclohexanedicarboxylic acids with diacids A and diol B gives a polyester having a significantly lower Tg than is obtained when the carboxycyclohexanecarboxylate groups are present as terminal groups according to our invention.

COMPARATIVE EXAMPLE 1

Terephthalic acid (365.64 g, 2.201 mol), 1,3-cyclohexanedicarboxylic acid (cis:trans=about 30:70) (66.87 g, 0.388 mol) and butanestannoic acid (FASCAT 4100, 0.6 g) were added to a melt of 2,2-dimethyl-1,3-propanediol (263.60 g, 2.531 mol) in a 1 L, 3-necked, round-bottom flask. The contents of the flask were swept with 1.0 standard cubic feet per hour (scfh) nitrogen and heated to 200° C. over a period of about 30 minutes. The reaction mixture was heated at 200° C. for 3 hours, at 210° C. for 2 hours and at 220° C. for 1 hour while distilling off the water of reaction. The temperature then was raised to and maintained at 230° C. until (about 6 hours) the acid number of the polyester was 30 to 40. The molten polymer was poured into a syrup can where it was allowed to cool to a white solid. The polyester thus obtained had an I.V. of 0.195, an ICI melt viscosity at 200° C. of 23 poise, an acid number of 44.0, a hydroxyl number of 28.0 and a glass transition temperature of 56° C. The polyester had a weight average molecular weight of 9160 and a number average molecular weight of 2954 (Mw/Mn=3.1).

COMPARATIVE EXAMPLE 2

The procedure described in Comparative Example 1 was repeated using an identical amount of 1,4-cyclohexanedicarboxylic acid. The carboxyl polyester thus obtained had an I.V. of 0.165, an ICI melt viscosity at 200° C. of 20 poise, an acid number of 56, a hydroxyl number of 28 and a glass transition temperature of 53° C. The polyester had a weight average molecular weight of 8283 and a number average molecular weight of 3002 (Mw/Mn=2.8).

The invention has been described in detail with particular reference to preferred embodiments thereof, but it will be understood that variations and modifications will be effected within the spirit and scope of the invention.

We claim:

1. A carboxyl polyester having (i) an inherent viscosity of about 0.1 to 0.4, (ii) a glass transition temperature of about 55 to 70° C., (iii) an acid number of about 20 to 50, and (iv) a number average molecular weight of about 1500 to 5000 comprised of:
   A. diacid residues comprising at least about 95 mole percent aromatic dicarboxylic acid residues;
   B. diol residues comprising at least about 95 mole percent of (i) 2,2-dimethyl-1,3-propanediol residues or (ii) a mixture of at least 40 mole percent 2,2-dimethyl-1,3-propanediol and up to 60 mole percent 1,4-cyclohexanedimethanol and/or 2,2,4,4-tetramethyl-1,3-cyclobutanediol;
   C. up to about 5 mole percent of triol residues; and
   D. terminal 3- and/or 4-carboxycyclohexanecarboxylate groups.

2. A carboxyl polyester according to claim 1 having (i) an inherent viscosity of about 0.15 to 0.3, (ii) a glass transition temperature of about 60° to 65° C., (iii) an acid number of about 25 to 40, and (iv) a number average molecular weight of about 2000 to 3500.

3. A carboxyl polyester having (i) an inherent viscosity of about 0.15 to 0.3, (ii) a glass transition temperature of about 60 to 65° C., (iii) an acid number of about 25 to 40, and (iv) a number average molecular weight of about 2000 to 3500 comprised of:
  A. diacid residues consisting essentially of isophthalic and/or terephthalic acid residues;
  B. diol residues consisting essentially of 2,2-dimethyl-1,3-propanediol residues; and
  C. up to about 5 mole percent of triol residues; and
  D. about 2 to 10 mole percent, based on the total moles of components A, B and C, of terminal 3- and/or 4-carboxycyclohexanecarboxylate groups.

4. A process for the preparation of the carboxyl polyester defined in claim 1 which comprises reacting a hydroxyl polyester having (i) an inherent viscosity of about 0.1 to 0.4, (ii) a glass transition temperature of about 60° to 70° C., (iii) a hydroxyl number of about 20 to 50, and (iv) a number average molecular weight of about 1500 to 5000 comprised of:
  A. diacid residues comprising at least about 95 mole percent aromatic dicarboxylic acid residues;
  B. diol residues comprising at least about 95 mole percent of (i) 2,2-dimethyl-1,3-propanediol residues or (ii) a mixture of at least 40 mole percent 2,2-dimethyl-1,3-propanediol and up to 60 mole percent 1,4-cyclohexanedimethanol and/or 2,2,4,4-tetramethyl-1,3-cyclobutanediol; and
  C. up to about 5 mole percent of triol residues; with 1,3-cyclohexanedicarboxylic acid, 1,4-cyclohexanedicarboxylic acid, 1,3-cyclohexanedicarboxylic anhydride, 1,4-cyclohexanedicarboxylic anhydride or any combination thereof.

5. A process for the preparation of the carboxyl polyester defined in claim 2 which comprises reacting a hydroxyl polyester having (i) an inherent viscosity of about 0.15 to 0.3, (ii) a glass transition temperature of about 60° to 65° C., (iii) a hydroxyl number of about 25 to 40, and (iv) a number average molecular weight of about 2000 to 3500 comprised of:
  A. diacid residues comprising at least about 95 mole percent aromatic dicarboxylic acid residues;
  B. diol residues comprising at least about 95 mole percent of (i) 2,2-dimethyl-1,3-propanediol residues or (ii) a mixture of at least 40 mole percent 2,2-dimethyl-1,3-propanediol and up to 60 mole percent 1,4-cyclohexanedimethanol and/or 2,2,4,4-tetramethyl-1,3-cyclobutanediol; and
  C. up to about 5 mole percent of triol residues; with 1,3-cyclohexanedicarboxylic acid, 1,4-cyclohexanedicarboxylic acid, 1,3-cyclohexanedicarboxylic anhydride, 1,4-cyclohexanedicarboxylic anhydride or any combination thereof.

6. A process for the preparation of the carboxyl polyester defined in claim 3 which comprises reacting at a temperature of about 200° to 250° C. a hydroxyl polyester having (i) an inherent viscosity of about 0.15 to 0.3, (ii) a glass transition temperature of about 60° to 70° C., (iii) a hydroxyl number of about 25 to 40, and (iv) a number average molecular weight of about 2000 to 3500 comprised of:
  A. diacid residues consisting essentially of isophthalic and/or terephthalic acid residues; and
  B. diol residues consisting essentially of 2,2-dimethyl-1,3-propanediol residues;
with 1,3-cyclohexanedicarboxylic acid, 1,4-cyclohexanedicarboxylic acid or a mixture thereof.

7. A process for the preparation of the carboxyl polyester defined in claim 3 which comprises reacting at a temperature of about 200° to 250° C. a hydroxyl polyester having (i) an inherent viscosity of about 0.15 to 0.3, (ii) a glass transition temperature of about 60° to 70° C., (iii) a hydroxyl number of about 25 to 40, and (iv) a number average molecular weight of about 2000 to 3500 comprised of:
  A. diacid residues consisting essentially of isophthalic and/or terephthalic acid residues; and
  B. diol residues consisting essentially of 2,2-dimethyl-1,3-propanediol residues;
with 1,3-cyclohexanedicarboxylic anhydride, 1,4-cyclohexanedicarboxylic anhydride or a mixture thereof.

* * * * *